US 8,577,852 B2

(12) United States Patent
Haagenson et al.

(10) Patent No.: US 8,577,852 B2
(45) Date of Patent: Nov. 5, 2013

(54) AUTOMATED RECORDS INVENTORY AND RETENTION SCHEDULE GENERATION SYSTEM

(75) Inventors: Marsha K. Haagenson, Minneapolis, MN (US); Jeanne B. Caldwell, Denver, CO (US)

(73) Assignees: Infaxiom Group, LLC, Denver, CO (US); Jeanne B. Caldwell, Denver, CO (US)

( * ) Notice: Subject to any disclaimer, the term of this patent is extended or adjusted under 35 U.S.C. 154(b) by 837 days.

(21) Appl. No.: 11/690,410

(22) Filed: Mar. 23, 2007

(65) Prior Publication Data

US 2007/0226267 A1  Sep. 27, 2007

Related U.S. Application Data

(60) Provisional application No. 60/743,704, filed on Mar. 23, 2006.

(51) Int. Cl.
*G06F 17/00* (2006.01)

(52) U.S. Cl.
USPC ............................................. 707/694

(58) Field of Classification Search
USPC ................................ 707/204, 694
See application file for complete search history.

(56) References Cited

U.S. PATENT DOCUMENTS

| | | | | |
|---|---|---|---|---|
| 4,899,299 A * | 2/1990 | MacPhail | ...................... | 707/204 |
| 5,813,009 A * | 9/1998 | Johnson et al. | ................ | 707/695 |
| 5,873,100 A * | 2/1999 | Adams et al. | .................. | 707/204 |
| 6,185,576 B1 * | 2/2001 | McIntosh | .............................. | 1/1 |
| 6,317,795 B1 * | 11/2001 | Malkin et al. | .................. | 709/246 |
| 7,107,298 B2 * | 9/2006 | Prahlad et al. | ................ | 707/640 |
| 7,287,048 B2 * | 10/2007 | Bourbonnais et al. | ................ | 1/1 |
| 7,392,234 B2 * | 6/2008 | Shaath et al. | ........................... | 1/1 |
| 7,594,082 B1 * | 9/2009 | Kilday et al. | .................. | 711/154 |
| 7,680,830 B1 * | 3/2010 | Ohr et al. | ................... | 707/999.2 |
| 7,720,825 B2 * | 5/2010 | Pelletier et al. | ............... | 707/694 |
| 7,734,595 B2 * | 6/2010 | Margolus | ........................ | 707/662 |
| 7,739,746 B2 * | 6/2010 | Donahue | ......................... | 726/27 |
| 2002/0010708 A1 * | 1/2002 | McIntosh | ....................... | 707/500 |
| 2002/0194014 A1 * | 12/2002 | Starnes et al. | ..................... | 705/1 |
| 2003/0236788 A1 * | 12/2003 | Kanellos et al. | .............. | 707/100 |

(Continued)

OTHER PUBLICATIONS

Cohasset Associates, Inc., "Compliance Requirements Assessment, IBM DB2 Records Manager and Record-Enabled Solutions", pp. 1-54, Oct. 31, 2004, Chicago, IL.*

*Primary Examiner* — S Hasan
*Assistant Examiner* — Kurt Mueller
(74) *Attorney, Agent, or Firm* — St. Onge Steward Johnston & Reens LLC (57) ABSTRACT

A computer-implemented system assigns retention rules to a plurality of record categories. The system receives information from a system administrator and the organization to which the retention rules are to apply. Initially, an administrator selects business types and functions that apply to the organization. The system uses the business types and functions selections to select from a large set of questions, a subset of questions that pertain to the retention requirements for the organization's records. The organization employees answer the selected questions, and based on these answers the system determines a set of record categories defining the organization's records. The system then selects from a set of retention rules forming a part of the system, the rules that apply to the organization's record categories. The system provides a formalized approval process by the organization for the retention rule assignments to the record categories.

14 Claims, 9 Drawing Sheets

(56) References Cited

U.S. PATENT DOCUMENTS

| | | |
|---|---|---|
| 2004/0019846 A1* | 1/2004 | Castellani et al. ............ 715/500 |
| 2005/0125411 A1* | 6/2005 | Kilian et al. .................... 707/10 |
| 2006/0004820 A1* | 1/2006 | Claudatos et al. ............ 707/101 |
| 2006/0010301 A1* | 1/2006 | Yagawa ........................ 711/163 |
| 2006/0085374 A1* | 4/2006 | Mayes et al. ...................... 707/1 |
| 2006/0123004 A1* | 6/2006 | Rapp ................................. 707/8 |
| 2006/0156382 A1* | 7/2006 | Motoyama ........................ 726/1 |
| 2006/0218198 A1* | 9/2006 | Brown et al. ................. 707/200 |
| 2007/0100950 A1* | 5/2007 | Bornstein et al. ............ 709/206 |
| 2007/0157203 A1* | 7/2007 | Lim ................................ 718/100 |
| 2007/0271308 A1* | 11/2007 | Bentley et al. ................ 707/200 |
| 2007/0282624 A1* | 12/2007 | Athey et al. ....................... 705/1 |
| 2008/0154969 A1* | 6/2008 | DeBie .......................... 707/200 |

* cited by examiner

AUTOMATED RECORDS INVENTORY AND RETENTION SCHEDULE GENERATION SYSTEM

CLAIM OF PRIORITY

This invention is based on a provisional application filed on Mar. 23, 2006 and having the application No. 60/743,704.

BACKGROUND OF THE INVENTION

Business and other types of enterprises (generally referred to hereafter as "organizations") create enormous numbers of records in the course of their operation. Laws and regulations govern the length of time for preserving many of these records. For example, organizations need not hold employee time-keeping records longer than three years.

The length of time that records are preserved depends on the type of record involved and the legal requirements that apply to the record type. Legal requirements depend in many cases on the jurisdiction (state law) involved. The time specified for preserving a record is its retention period. Records are often classified into groups that have similar functions and identical retention periods. The process of storing and classifying records, setting retention rules for records, and eventually destroying or deleting them is call records management.

For legal and space reasons, it is wise for enterprises to destroy records that need no longer be preserved. State, Federal, and decisional laws specify the retention periods for many classes of records. Additionally, business and administrative needs for records are also taken into consideration when developing retention rules and corresponding retention periods. Where large numbers of records are involved, the process of setting retention rules for records and identifying records whose retention periods have expired is burdensome.

Donald Skupsky is a recognized expert on records management in the United States. Information Requirements Clearinghouse is a business that presents Mr. Skupsky's opinions on records management. Mr. Skupsky has published *Records Retention Procedures,* 1995, ISBN: 0-929316-03-7, and available from the International Association of Records Managers and Administrators.

Typically, larger organizations comprise a number of departments. Each department has a set of records that is unique relative to other departments of the organization. For purposes of this description, each department has a person assigned to it, referred to hereafter as a user, who has responsibility for managing the records of the department. A single user may of course have responsibility for more than one department.

BRIEF DESCRIPTION OF THE INVENTION

Managing the records for organizations is difficult and labor-intensive. Taking a database approach to records management seems an obvious way to improve this process. However, creating computer-based records management is difficult. Many laws, people, and organization departments are involved, to say nothing of the large number of many different types of records.

The system of the invention is designed for use in an organization having an organization administrator having overall responsibility for the records of the organization. The system design contemplates the presence of one or more users as well. Each of the users and the organization administrator has his or her own computer for communicating with the system.

It is usually convenient to have an administrator computer in the system for use by a system administrator. Each of the organization and administrator computers can communicate with the host computer. All of the computers have memories for storing data. The system administrator has overall responsibility for operation of the system, and for initial setup of the system to serve an organization.

In one preferred arrangement, the system operates in a distributed computing system. The Internet allows each of the users, the organization administrator, and the system administrator to provide information to the system without the necessity for them to be geographically proximate.

This invention is a computer-based method or apparatus for providing an electronically prepared records retention schedule for a selected organization. The system includes a host computer and at least one organization computer used by the organization administrator. The system can receive and process information from a number of different users who have responsibility for managing records. In a less sophisticated embodiment, a single person can perform the duties of all of the users, the organization administrator, and the system administrator. In such an arrangement, a single computer can perform the activities of the host computer and the user and organization computers.

The invention has an initial action that loads into the host computer memory, a Business Types and Functions Table, a Master Questions Table, a Baseline Record Categories Master Table, and a Baseline Retention Rules Master Table. Each table has a plurality of entries respectively comprising business types and functions descriptions, business-related questions, baseline record category descriptions, baseline retention rules and linked legal requirements.

A second action provides a signal to the host computer selecting a subset of entries from the Business Types and Functions Table.

Another action provides a signal to the host computer selecting a subset of entries from the Master Questions Table based on the entries selected from the Business Types and Functions Table, and providing a signal to at least one organization computer displaying said subset of questions on said organization computer.

Another action receives a signal from the at least one organization computer containing answers to the selected subset of business-related questions, and records said answers to the questions in the host computer memory in an Organization Answers Table.

The method continues with the action of selecting a subset of the baseline records category entries based on the questionnaire answers, and recording said subset of baseline records category entries as an Organization Record Categories Table in the host computer memory.

Finally, the method associates a rule from the Baseline Retention Rules Master Table with each of the entries in the Organization Record Categories Table. This association can be used as the retention schedule.

DESCRIPTION OF THE PREFERRED EMBODIMENTS

Figure 1:
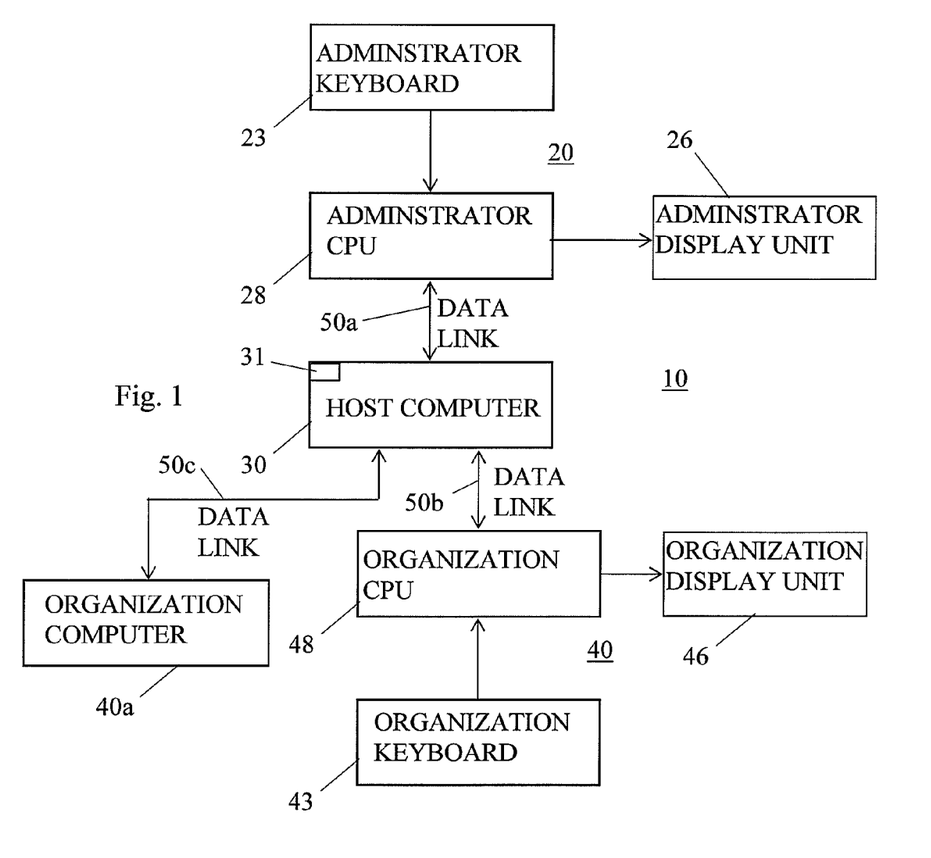
FIG. 1 shows a typical computer system suitable for implementing the invention.

FIG. 1 shows a typical computer system 10 in which a record inventory system constructed according to the invention operates. System 10 comprises at least three computers, a host computer 30, an administrator computer 20, and one or more organization computers 40, 40a. Conceivably, the host computer 30 and the administrator computer 20 may be the same computer.

In fact, in some embodiments, the same computer may play the roles of all three types of computer. This of course would make it less convenient for more than one user to easily access the system.

It is of course well known that computers comprise electrical circuits. As such, one view of the invention is as a plurality of electrical circuits having specified functionality. Not all of the electrical circuits exist simultaneously, but that does not matter for purposes of supporting a definition of the invention in apparatus claims.

Computers 20 and 40, 40a are typical desktop units connected to the host computer 30 by a data link 50a, 50b, or 50c. Most often, data links 50a-50c comprise Internet connections, but other types of connections to host computer 30 are possible as well. For example, if a single organization is to have its own internal record inventory system, the connections will be Ethernet, Intranet, or other means of connecting the computers involved.

Each of the computers 20 and 40, 40a include respectively, a CPU 28 or 48, a keyboard 23 or 43, and a display unit 26 or 46. Thus, one can see that each of these computers 20 and 40, 40a are completely conventional from a hardware standpoint.

Host computer 30 is also conventional. Typically, a host computer is a machine with powerful computing functionality and many high speed connections to the Internet. Many businesses exist which provide host computer services, and nothing unique is involved in this type of arrangement. Host computer 30 includes a large and fast memory element 31 capable of holding hundreds of gigabytes of data.

Generally, a computer hosting service allows a customer such as the person playing the system administrator role in this invention, to download proprietary software into the host computer 30 memory. A system administrator strikes keys in keyboard 23 that provide signals to CPU 28, which in turn provides signals to host computer 30 on data link 50a. The signals from administrator CPU 28 thus represent keys struck on keyboard 23. The administrator's access to host computer 30 typically requires the administrator to supply a password.

The system administrator provides signals from administrator computer 20 that cause host computer 30 to transmit and accept signals on data link 50b and 50c to and from organization computers 40, 40a. Here too, password use can assure that only organization computers 40, 40a that have proper authority can use the record inventory system.

Organization computers 40, 40a are operated by employees of an organization performing a records retention project. One of the organization's employees is designated the organization administrator, and he or she has overall responsibility for the project.

Figure 2:
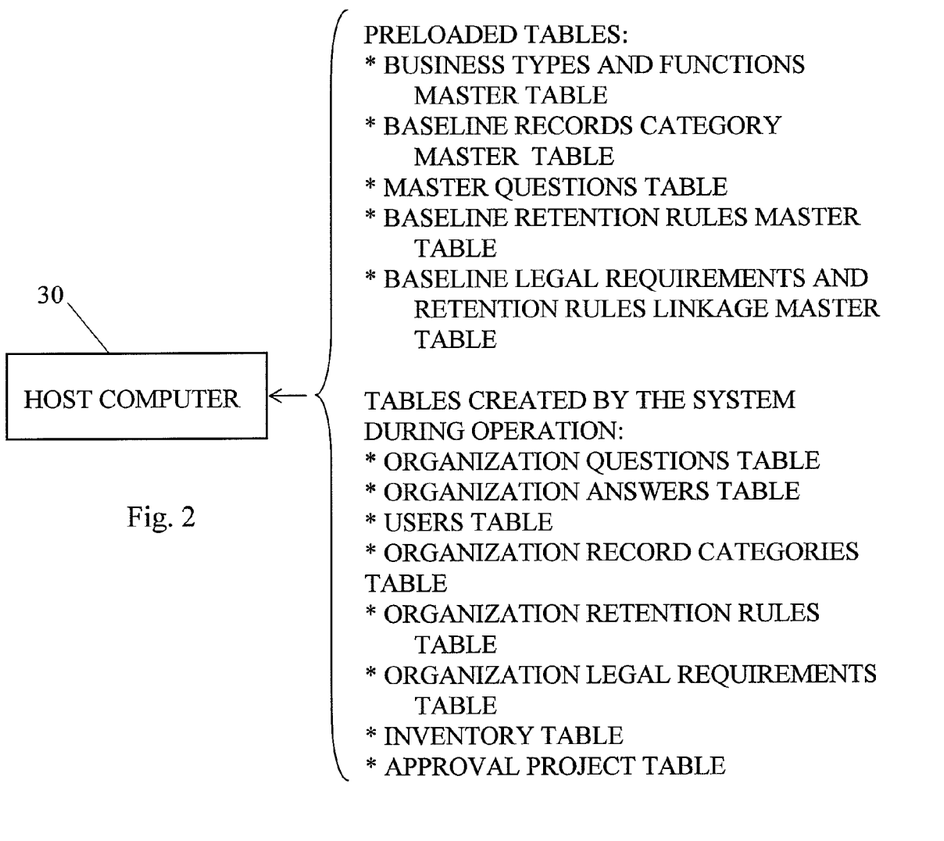
FIG. 2 shows important tables forming a part of the invention and formed by the operation of the invention.

FIG. 2 shows host computer 30 with a listing of tables maintained in the host computer memory 31. The content and purpose of these tables are important to the understanding and operation of the invention.

The term "table" as used in this description refers to an organized data storage element that has a plurality of entries. Each entry has an identical structure having one or more fields. Each field contains a particular type of data. The system can retrieve any of the entries in a table in typically one of two ways. In one case, the location of the entry in the table serves to identify the entry. In another, the table may have an identifier field with a unique value. Searching the table for the desired identifier table value identifies the entry. For purposes of this invention, these two procedures for accessing a table entry are identical.

Frequently in this description, a table will contain information from other tables. It is not necessary to reproduce this information in each table containing the information. Instead, a table may simply comprise entries that refer or link to entries in other tables either by the index or the identifier field associated with the other table's entries. For the purposes of this description, such tables are the functional equivalent of a conventional table physically holding the actual data or information rather than pointing or linking to another table. Those familiar with data base management understand this to be a common practice.

The following lists briefly describe each of the tables necessary to implement the invention. These descriptions improve understanding of FIGS. 3-9.

Preloaded Tables

Business Type/Function Master Table—A comprehensive list of types and functions that an organization may have Baseline Records Category Master Table 112—Specifies many categories of records commonly found in organizations Master Questions Table—A comprehensive list of questions to which the answers indicate the types of records that an enterprise or organization may have Baseline Retention Rules Master Table 118—Specifies the retention period for each of many categories of baseline record categories commonly found in organizations Baseline Legal Requirements and Retention Rules Linkage Master Table 117—Holds many common legal requirements that form the basis for particular retention rules; each entry links to one or more entries in the Baseline Retention Rules Master Table 118

Tables Created by the System During Operation

Organization Questions Table—Comprises a subset of questions from the Master Question Table; this subset of questions is tailored for the organization by the system administrator Organization Answers Table—Answers to the Organization Questions Table supplied by the users in the organization by replying to the Organization Questions Users Table—Identifies the individual users in the organization; correlates users with business type and function responsibilities, department records inventory responsibilities, and approval responsibilities Organization Record Categories Table—Listing of all of the records held by the organization that are listed in the Baseline Records Category Master Table Organization Retention Rules Table—Each entry: specifies a retention rule; links each entry in the Organization Record Categories Table with one entry in the Baseline Record Categories Master Table 112; has one or more status fields that indicate whether a user has approved the rule or if the approval is still pending; links to relevant entries in the Organization Legal Requirements Table—Has entries holding information about legal requirements on which retention rules are based; individual entries link to entries in the Organization Retention Rules Table Inventory Table—Each entry: links to one record category in the Organization Record Categories Table or holds a custom record category; identifies the departments holding each record category Approval Project Table—Links to one or more Organization Retention Rules Table entries that collectively comprise the approval project; each entry identifies the users authorized to approve the rules and the approval status of each item to be approved; includes a lock field which when set indicates that the approval project and related items have been locked and archived Software Block Diagram The invention actually operates within all three of the computer classes 20, 30, and 40, 40*a*. The block diagrams in FIGS. 3-9 identify the functionality within these computers that the software system of the invention creates. The invention exists within and is executed cooperatively by these computer classes.

Individual blocks in FIGS. 3-9 represent either data sources (tables) or computer processing of data source or inputs from system administrators, organization administrators, and users. Arrows from one block to another indicate data flows and a preferred order of processing operations. All of this is clear from the description of these blocks.

The explanation of FIGS. 3-9 that follows will identify either explicitly or implicitly, the computer that executes the software providing the functionality of each of the blocks in FIGS. 3-9. As previously stated, a typical embodiment uses host computer 30 to hold the various tables used in implementing the invention. However, it is possible that in some embodiments the preloaded tables can reside in the system administrator computer 20.

Those familiar with computers know that computers are formed of electrical circuits. During the execution of software such as that implementing this invention, one can think of computers 20, 30, and 40, 40*a* as continually changing electrical and magnetic states to sequentially comprise the various functional elements shown in FIGS. 3-9. These physical alterations in computers 20, 30, and 40, 40*a* are no different in concept from changes occurring during any other type of process.

Figure 3:
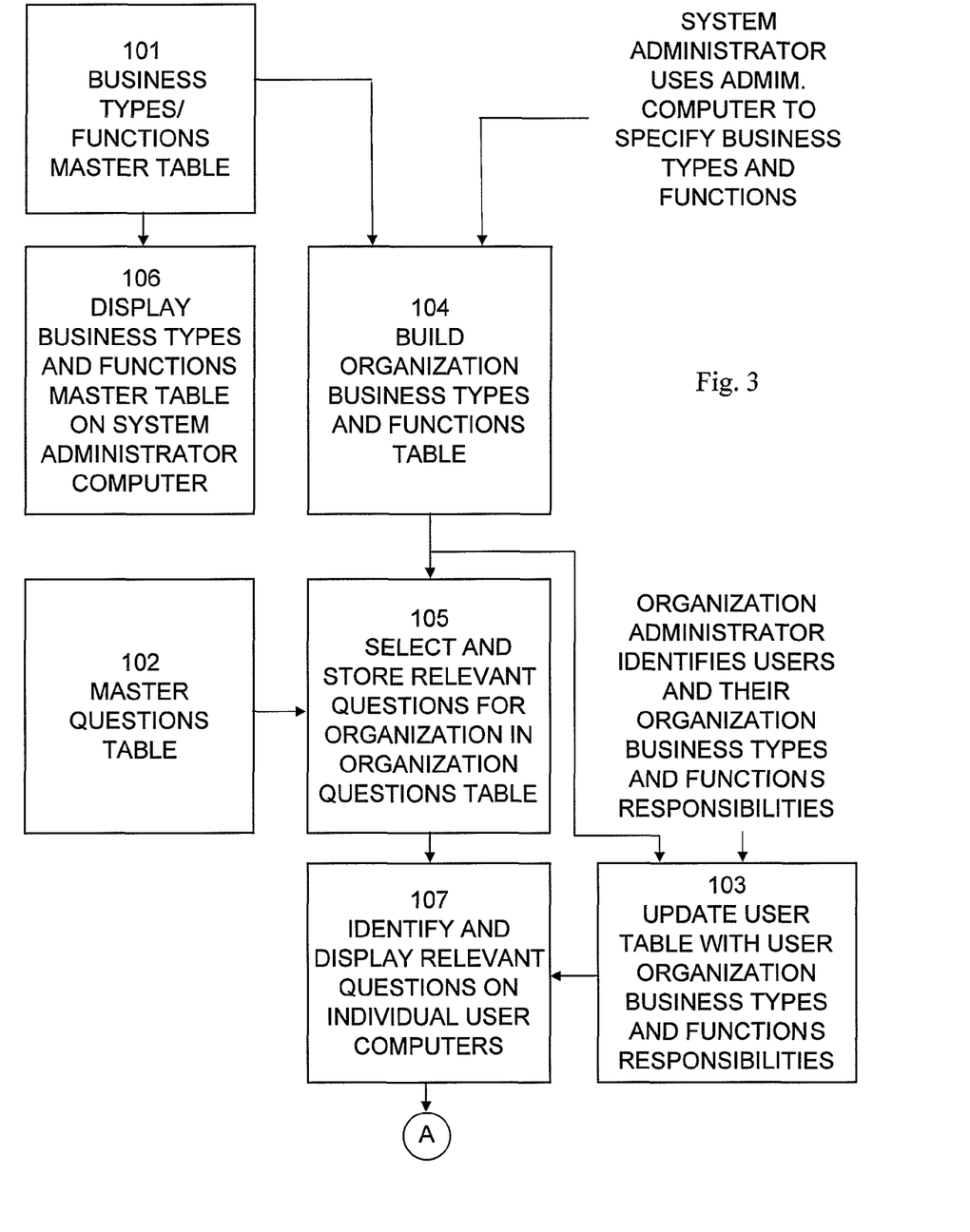
FIGS. 3-9 collectively form a functional block diagram of the invention.

Turning first to FIG. 3, the host computer 30 memory initially holds the Business Types and Functions Master Table shown as data element 101. As the name implies, the Business Types and Functions Master Table 101 contains a listing of many types of businesses and business functions. Likely, the Business Types and Functions Master Table 101 will be open-ended, with the system administrator continually updating the contents.

The content of the Business Types and Functions Master Table forms one input to an activity element 104. Activity element 106 symbolizes the host computer 30 transmitting the Business Types and Functions Master Table 101 to the system administrator computer 30, which then displays same on display unit 26. Alternatively, the system administrator computer 30 may hold and directly display the Business Types and Functions Master Table 101.

Block 104 symbolizes the system administrator use of the administrator computer 20 to specify which of the Business Types and Functions Master Table 101 entries pertain to the organization for which a records retention schedule is to be prepared. These selections cause the host computer 30 to build and store the Organization Business Types and Functions Table, which are stored in the host computer 30 memory. Appendix A is a portion of a sample Business Types and Functions Master Table.

Block 105 symbolizes host computer 30 operations that select from the Master Questions Table 102, questions preloaded in the host computer 30 memory that are pertinent to the organization's operations. For example, some of these questions may determine the jurisdictions (states) in which the organization has operations. The questions in the Master Questions Table 102 are in the form of Yes-No or multiple-choice. Multiple choice questions can have more than one answer, e.g. for which types of employees do you track certifications and licenses: pilots, attorneys, CPAs, welders, etc. Appendix B is a portion of a sample Master Questions Table.

Individual questions in the Master Questions Table 102 are initially associated with individual entries in the Business Types and Functions Master Table 101, typically by the system administrator. Each entry in the Master Questions Table 102 is linked within memory 31 to one or more Business Types and Functions Master Table 101 entries. Here too, the organization administrator is likely to enlarge the Master Questions Table 102 as the software system is used for managing records for additional organizations.

The answers to the questions in the Master Questions Table 102 provide information about the types of records that the organization is likely to have. Not every question in a full-fledged Master Questions Table 102 is pertinent to every organization or business type and function, but the questions in the Master Questions Table 102 have been selected so that every question is pertinent to at least a few types of organizations.

Block 105 symbolizes host computer 30 operations that select the appropriate subset of questions from the Master Questions Table 102 based on the selections stored in the Organization Business Types and Functions Table. The pertinent questions in the Questions Master Table 102 may be identified for example by setting a flag in those entries of the Master Questions Table 102.

Of course, each organization must have its own list of flags in the Master Questions Table 102 dedicated to that organization. That list of flags is one preferred embodiment the Organization Questions Table. The justification for this step is to avoid presenting the users with perhaps hundreds of irrelevant questions during this phase of the records management process.

Block 103 symbolizes host computer 30 operations that use the Organization Business Types and Functions Table 101 contents and inputs from the organization administrator to load and update the User table.

Block 107 symbolizes host computer 30 operations that provide individual users with questions in the Master Questions Table that are specified by the Organization Questions Table. It is unlikely in at least a larger organization that a single user will be able to accurately answer questions about records held in all of the departments of an organization. For the convenience of the individual users, the system attempts to present to each user, only questions that are pertinent to the organization(s) and or which an individual user has business record responsibility.

A number of ways exist to perform this activity. In one embodiment, individual users log onto host computer 30 from their own organization computer 40, 40*a*, and identify themselves during the log-in process. Host computer 30, by executing the system software and by reference to the User Table and the Organization Questions Table, displays to an individual user after logging in, only the questions specified in the Organization Questions Table that been associated with that user's responsibilities in the User Table. The system software will in general allow only a single user to answer each of the selected questions in the Organization Questions Table.

Figure 4:
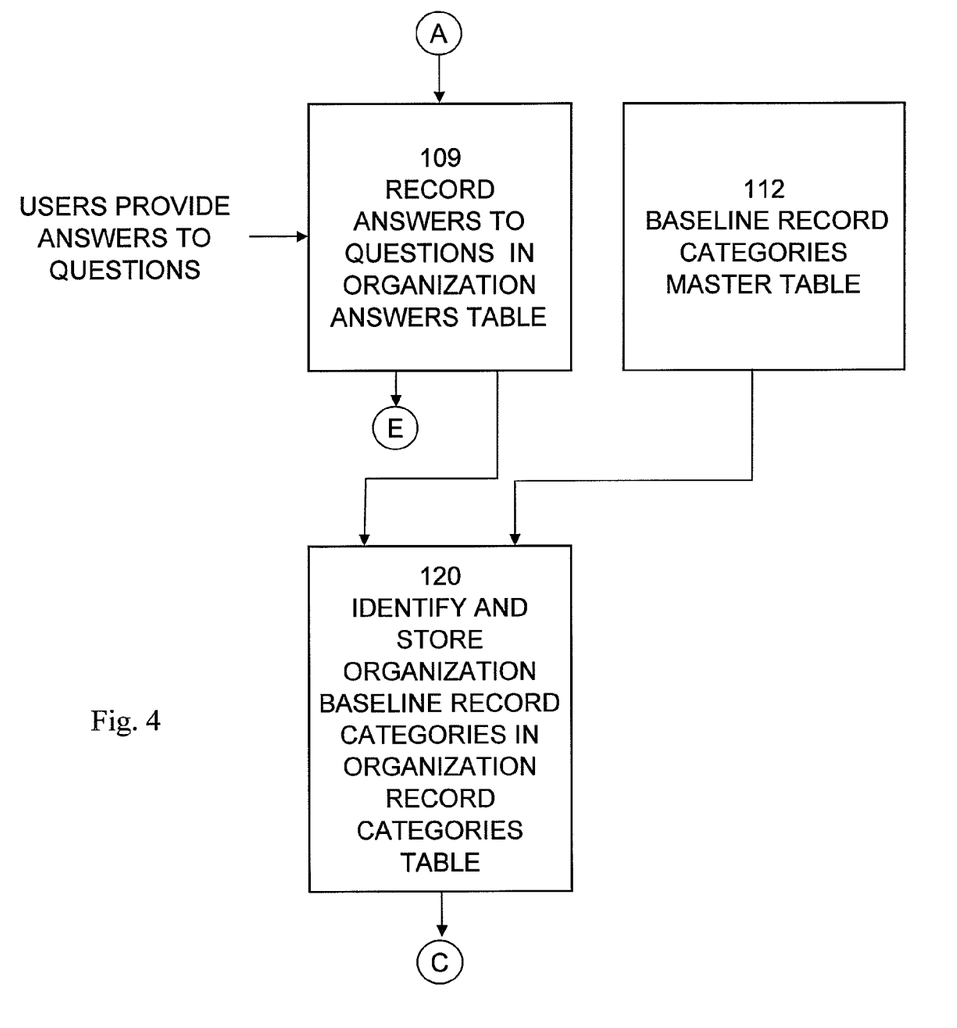

Block 109 in FIG. 4 symbolizes the actions of host computer 130 as individual users answer the questions that have been displayed for them. Each answer is recorded in the Organization Answers Table. After all of the users have answered the set of questions assigned to their department(s), then all of the questions in the Organization Questions Table will have been answered. The organization administrator will one way or another request or require the individual users to log in and answer the questions assigned to them.

Block 120 uses the Organization Answers Table and the Baseline Record Categories Master Table 112 to select entries from the Baseline Record Categories Master Table 112 entries for the Organization Record Categories Table.

Block 128 (FIG. 5) symbolizes an action by the organization administrator to update the Users Table with the users' departmental records inventory responsibilities. Block 122 symbolizes the host computer 30 action of then displaying these responsibilities to the individual users, in essence entering the records responsibilities for each of the users in the Users Table, and informing these users of their responsibilities.

Figure 5:
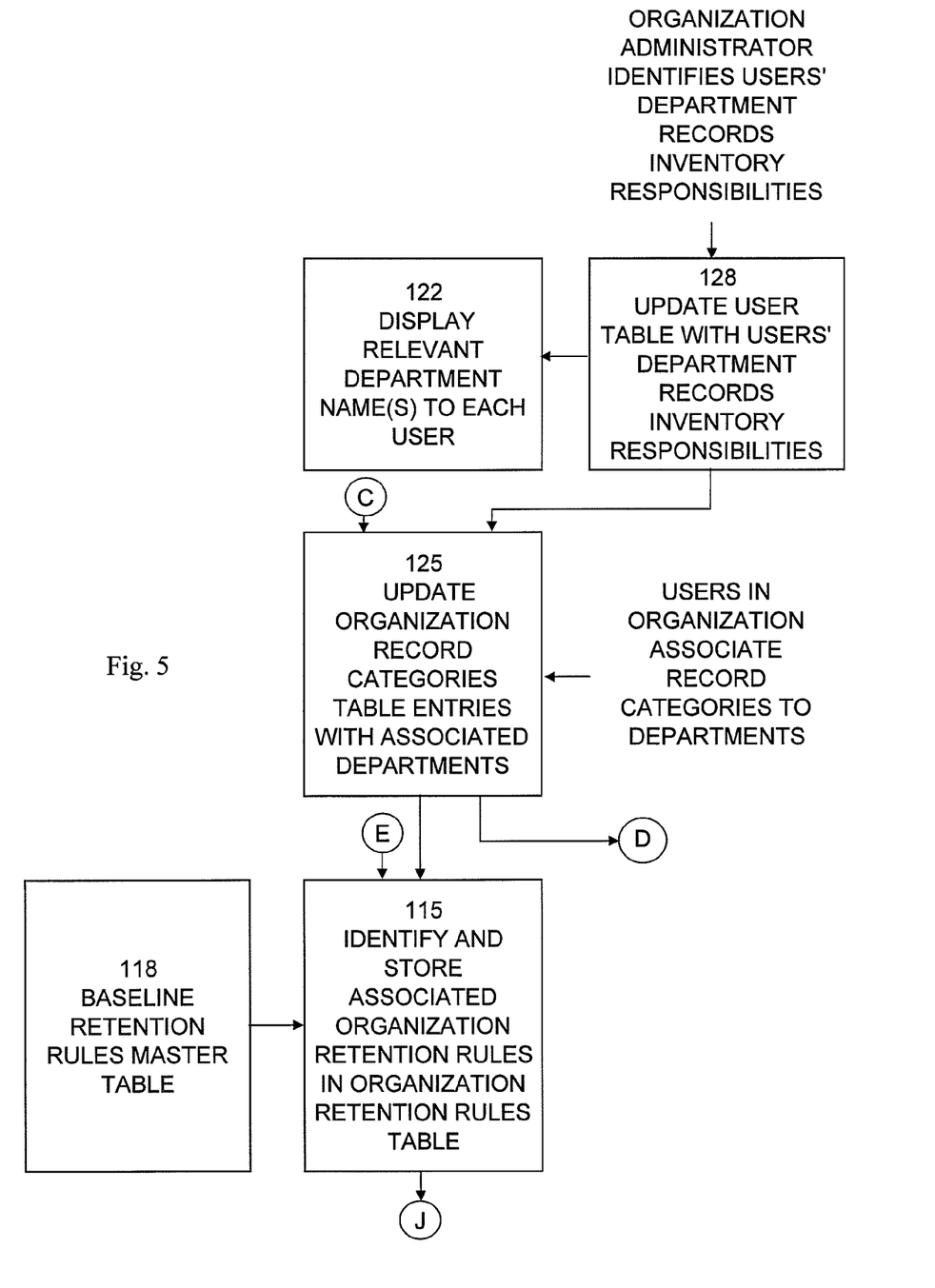

Next, block 125 symbolizes host computer 30 activities upon receiving signals from the users' computers 40, 40a in which the users associate their departmental responsibilities with the baseline records categories previously created by block 120. The users can refer to the display provided by the block 122 activity in providing the signals carrying these associations. Block 125 symbolizes the actions of host computer 130 to update the Organization Record Categories Table stored in memory 31 with the identity of the users' departmental responsibilities. The C connector element symbolizes access to the Organization Record Categories Table.

Block 115 symbolizes the system functionality that associates retention rules with the various record categories. The Baseline Retention Rules Master Table 118 has been previously loaded with the retention rules required for most organizations' records.

Each entry in the Organization Record Categories Table includes a record category that the Baseline Retention Rules Master Table 118 has previously associated with that category. Block 115 symbolizes the activity of inserting a link (association) between each entry in the Organization Record Categories Table and one entry in the Baseline Retention Rules Master Table 118. Block 115 activities simply record these associations in an Organization Retention Rules Table held in host computer 30 memory.

Figure 6:
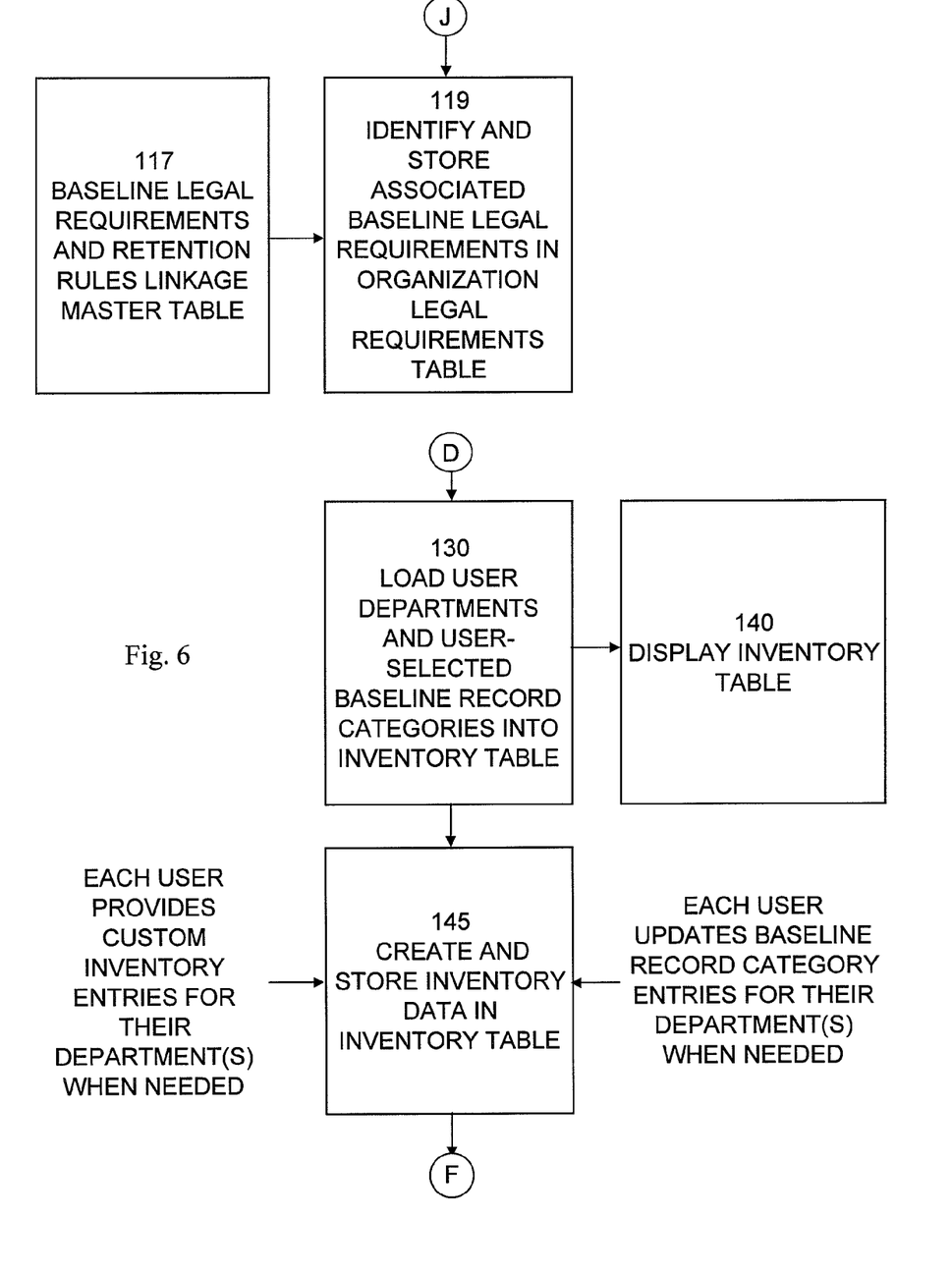

Records management professionals find it helpful to have access to the published retention rules and the statutes, regulations, and decisional law forming the basis for the content of the Baseline Legal Requirements and Retention Rules Linkage Master Table 117, which links to the Baseline Retention Rules Table 118. These legal requirements and the linkages to the Baseline Retention Rules Table 118 can be extracted from a variety of sources well known to records management professionals.

FIG. 6 shows the Baseline Legal Requirements and Retention Linkage Master Table 117 held in host computer memory 30. Table 117 such supporting citations and text and links these citations and text to the entries in the Baseline Retention Rules Master Table 118.

Block 119 symbolizes host computer 30 activities creating links in an Organization Legal Requirements Table between the Baseline Legal Requirements and Retention Linkage Master Table 117 and the Organization Retention Rules Table. The Organization Legal Requirements Table thus associates entries in the Baseline Retention Rules Master Table 117 with the entries in the Organization Retention Rules Table created by block 115. Block 119 accesses the Organization Retention Rules Table created by block 115 activities as implied by the flow connector J.

Block 130 symbolizes host computer 30 activities that use the information present in the Organization Baseline Records Categories Table (see block 125 discussion) to update the Inventory Table. Block 140 symbolizes host computer 30 transmitting the Inventory Table to each of the organization computers 40, 40a when requested by a users' actions on their computers 40, 40a.

The display of the Inventory Table by block 140 activities allows individual users to provide custom inventory entries to host computer 30 and to update and edit baseline record categories for their departments. Block 145 symbolizes host computer 30 receiving and storing this user input in the Inventory Table.

Figure 7:
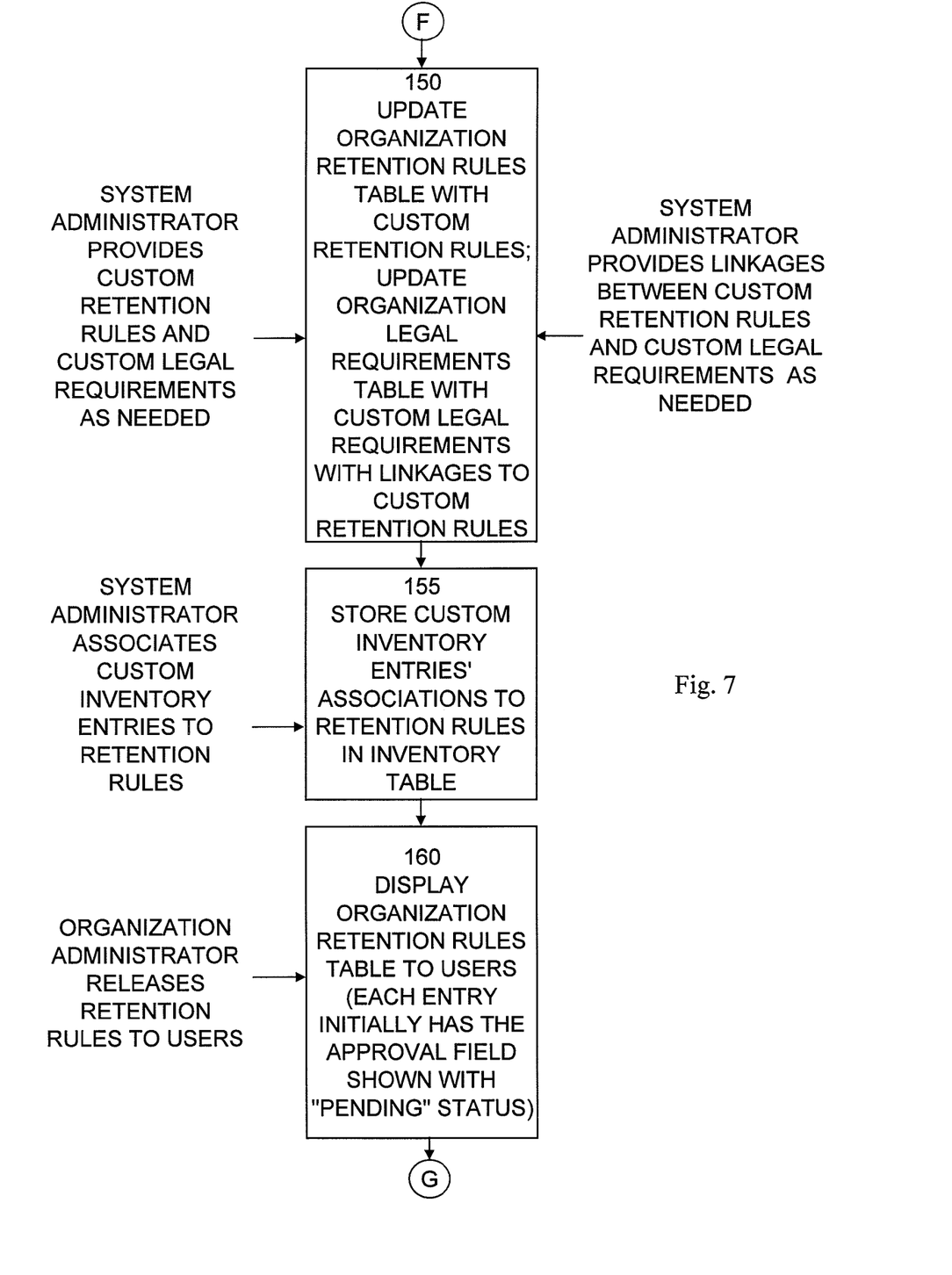

Connector F shows continuity from FIG. 6 to FIG. 7. The software system elements shown in FIG. 7 further update the Organization Retention Rules Table. The system administrator, who should be expert in records retention, provides custom retention rules and legal requirements that for any of a number of reasons are not available in the Baseline Retention Rules Master Table 118 and the Baseline Legal Requirements and Retention Rules Linkage Master Table 117. Block 150 symbolizes activity by the host computer 30 that loads this custom information into the Organization Retention Rules Table.

Block 150 also symbolizes host computer 30 activities that accept custom legal requirements and retention rules and load them into the Organization Retention Rules Table. Block 150 further updates the Organization Legal Requirements Table with these custom legal requirements.

Block 155 symbolizes host computer 30 activities that cooperate with the system administrator to associate previously entered custom inventory entries with baseline or custom retention rules contained in the Organization Retention Rules Table. Block 155 symbolizes software that processes system administrator inputs from the administrator computer 20 to store these associations in the Inventory Table.

An important feature of this software system is the ability to review the retention rules before the organization formally adopts them. The system allows individual users to review and approve the retention rules applied to each record category. The Approval Project Table stores data important for this review feature.

One important requirement for a records retention system is for the organization to approve all of the rules associated to the various records categories. Rules previously assigned to record categories within a department are grouped according to individual user responsibilities in an Approval Project Table. The individual users have the opportunity to review the retention rules assigned to them and the departments for which they have responsibility, and indicate acceptance or approval of the retention rule and its associated retention period. The users access these rule assignments through the Approval Project Table.

Each Approval Project Table entry is associated with one or more Organization Retention Rules Table entries by links to those entries. Each Approval Project Table entry also links to one or more Organization Retention Rules Table entries. The User Table links each user to the entries in the Organization Retention Rules Table that that user has responsibility to approve. Each Approval Project Table entry also has a status field that when set, indicates that all of the users who have approval responsibilities for the rules involved, have approved all of the Organization Retention Rules Table entries associated with that Approval Project Table entry.

Block 160 symbolizes organization administrator activities that grant to users, access to the Organization Retention Rules Table. In addition to the actual retention rules, the Organization Retention Rules Table also has in each entry, a status field that specifies the entry as "pending" or "approved."

Block 160 also symbolizes the activities of the host computer 30 to initially set the approval status of all of the Organization Retention Rules Table entries as "pending" during the process of releasing the Organization Retention Rules Table, which allows the users to access the Organization Retention Rules Table. Note that the baseline and custom retention rules and baseline and custom legal requirements have previously been linked to each of the Organization Retention Rules Table entries. Thus, when the users access the Organization Retention Rules Table entries, these rules and requirements are available to the users.

Figure 8:
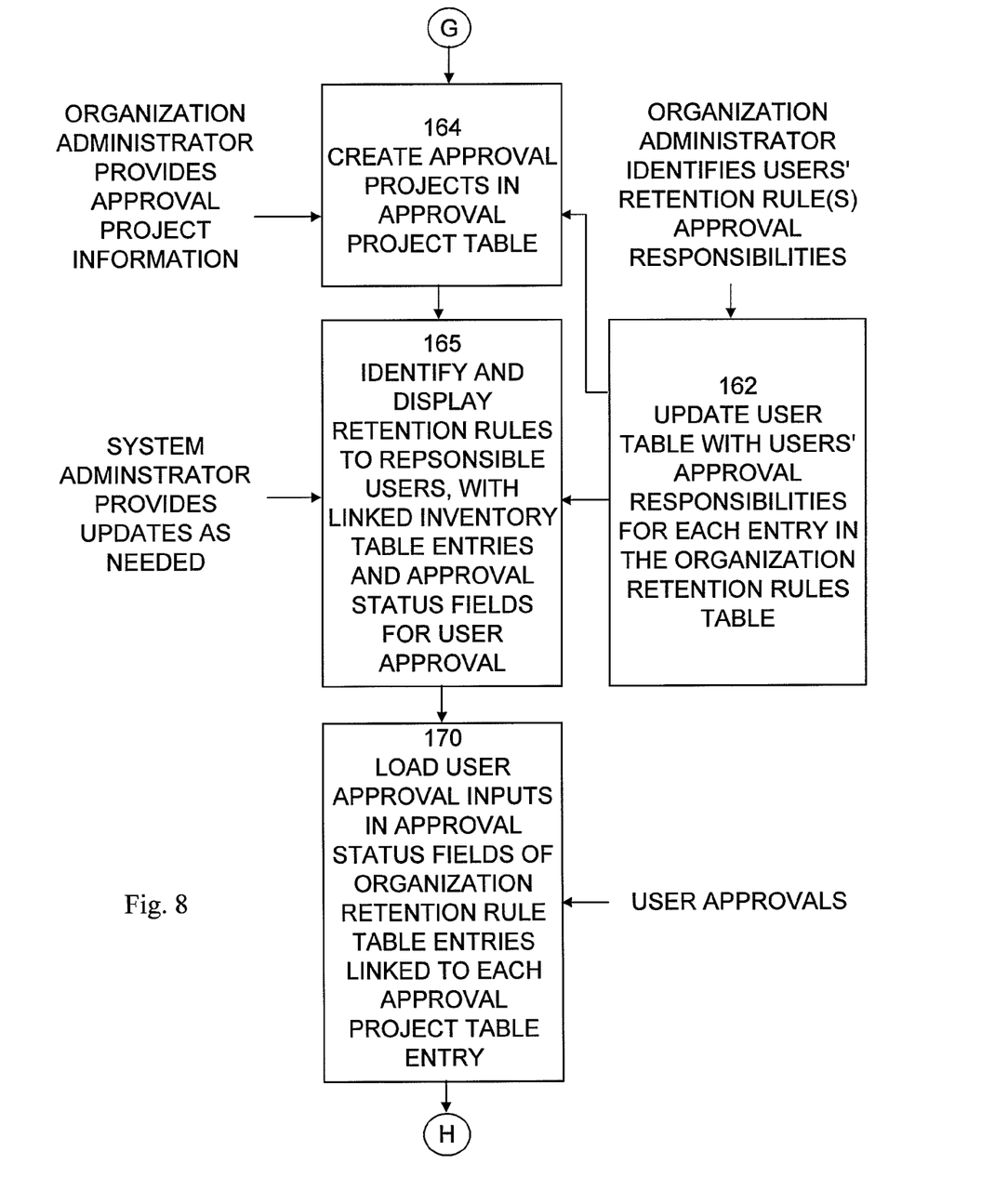

Block 162 of FIG. 8 allows the organization administrator to update the User Table with user responsibilities for the individual retention rules held in the Organization Retention Rules Table entries. The organization administrator sends signals from one of the organization computers 40, 40a to host computer 30. Block 162 software uses the organization administrator signals to assign in the User Table, entries in the Organization Retention Rules Table to the users. More than one user may be assigned to a single Organization Retention Rules Table entry. This allows multiple users in an organization to each approve a particular rule. In order for the approval process to be comprehensive, every entry in the Organization Retention Rules Table must be assigned to at least one user.

Block 164 permits the organization administrator to create approval projects in the Approval Project Table. Each entry in the Approval Project Table represents a single approval project. Block 164 uses information provided by the organization administrator from the organization computer 30 to assign a unique name to each approval project. Each Approval Project Table entry also has a lock flag that the organization administrator can set at some point in the approval project process. Once set, that approval project is complete and can no longer be changed in any way.

Block 165 uses the information loaded in the Project Approval Table to display each of the entries in the Organization Retention Rules Table to the users that have approval responsibility for that rule (entry). Block 165 gives each of the users the opportunity to approve each of the rules for which the user has approval responsibility. By referring to the user field in the Organization Retention Rules Table, block 165 software can display to the user only the entries in the Organization Retention Rules Table for which the user has approval responsibility.

Experience shows that incorrect retention rule assignments are difficult to avoid. Block 165 provides the system administrator with the opportunity to change rule assignments as appropriate during the approval process that is to follow.

The users then review, perhaps more than once, the rules for which they have responsibility. The screens that are displayed to the users by block 165 have boxes that the users can check to indicate approval of each of the retention rules they have the responsibility to approve within the various Organization Retention Rules Table entries.

Block 170 symbolizes activity by host computer 30 that loads these user approval indications into the Organization Retention Rules Table entries.

The system administrator can access the Approval Project Table on one of the administrator computers 40, 40a, and can check on the approval status for each of the approval projects (entries). In this way, the system administrator can find missing approvals, and remind or require individual users to complete their approval duties.

At some point, the organization administrator can judge that an approval project must be closed. It is entirely possible that not all of the individual users have completed all of their approval duties for that Approval Project Table entry at this point. Block 172 allows the organization administrator to close out a particular Approval Project Table entry (approval project) by setting a lock flag in that entry. Block 172 activities then accesses each of the Organization Retention Rules Table entries assigned to that entry of the Approval Project Table, and changes these entries' status flag from "pending" to "approved."

Figure 9:
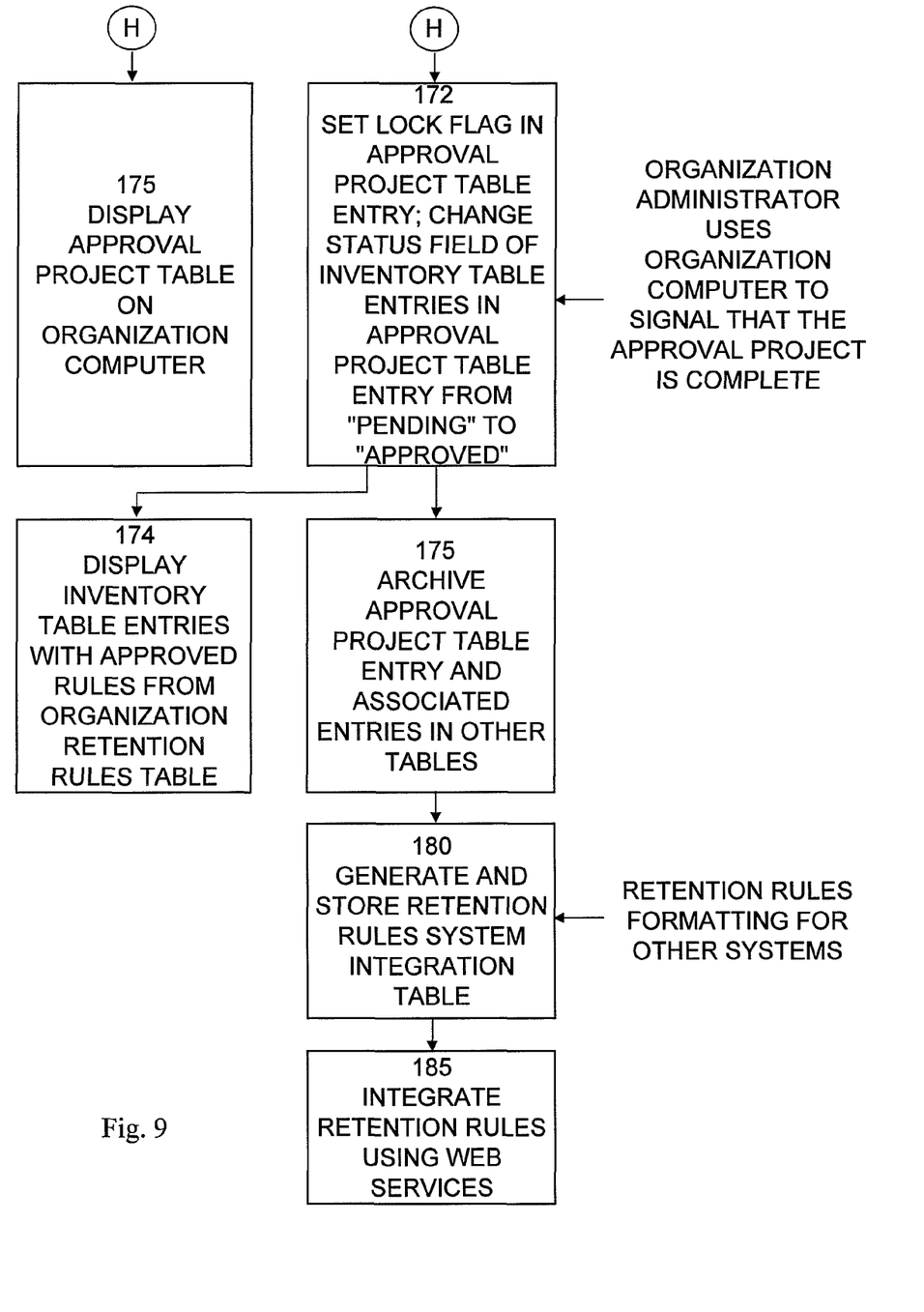

At this point, each of the entries in the Inventory Table has assigned to it, an approved retention rule, that is to say, an entry from the Organization Retention Rules Table. Block 174 symbolizes software that displays or otherwise makes this information available to users or others in the organization that may have an interest in this information.

Block 175 symbolizes the activity of archiving the Approval Project Table entry whose lock flag has been set. The archiving activity includes storing not only the Approval Project Table entry but also all of the associated entries in the Organization Retention Rules Table, the Organization Legal Requirements Table, and the Inventory Table.

On occasion, the various tables of this system can be advantageously linked to other content management systems. Block 180 represents formatting activity that conforms these tables to these other content management systems.

Block 185 indicates processing that formats and records the contents of the Organization Retention Rules Table, the Organization Legal Requirements Table, and the Inventory Table in a way that makes these tables available on the Internet to outside systems and persons. Because of the critical nature of this information, one expects that access must be limited to those with legitimate needs to view these tables.

APPENDIX A

Sample of a Portion of the Entries in the Business Types and Functions Table

| Business Type Code | Business Type Name | Business Function Code | Business Function Name |
|---|---|---|---|
| GB01 | General Business | HR01 | Human Resources |
| GB01 | General Business | AC01 | Accounting |
| GB01 | General Business | FI01 | Finance |
| GB01 | General Business | LE01 | Legal |
| NG01 | Natural Gas | EX01 | Exploration |
| NG01 | Natural Gas | US01 | Underground Storage |
| HG01 | Natural Gas | TP01 | Pipeline Transportation |

APPENDIX B

Sample of a Portion of the Entries in the Master Questions Table

1. Where does the company have employees:

[ ]All 50 States  [ ]Arizona
[ ]Alabama  [ ]Arkansas
[ ]Alaska  [ ]...

2. Does the company employ:

APPENDIX B-continued

Sample of a Portion of the Entries in the Master Questions Table

| | |
|---|---|
| [ ]Student workers or interns | [ ]Child labor |
| [ ]Expatriates or aliens | [ ]Union labor |

3. Does the company require any of the following certifications or licenses for individuals to perform their jobs:

| | |
|---|---|
| [ ]Pilot | [ ]Welder |
| [ ]Attorney | [ ]Medical Professional |
| [ ]Chauffeur | [ ]CPA |

4. Regarding employee health and medical records, select all that apply:

| | |
|---|---|
| [ ]Generate medical waste | [ ]Employment random drug screenings |
| [ ]Medical records being maintained by 3rd party administrator | [ ]Onsite medical facility |
| [ ]Dispense drugs | [ ]Contract for medical services |
| [ ]Pre-employment drug screenings | |

5. Does the company have an affirmative action plan:

( )Yes ( )No

6. Does the company have an educational assistance program:

( )Yes ( )No

7. Does the company have any of the following types of compensation:

| | |
|---|---|
| [ ]Commissions | [ ]Compensation |
| [ ]Incentives | [ ]Bonuses |

We claim:

1. A method for providing an electronically prepared records retention schedule for a selected organization, comprising the steps of:
    a) providing a host computer accessible via the Internet by at least one organization computer, the host computer comprising a memory having stored therein, a Baseline Record Categories Master Table, Baseline Retention Rules Master Table, Business Types and Functions Table, and a Master Questions Table, each table having a plurality of entries respectively comprising baseline record category descriptions, and record retention rules, business types and functions descriptions, and business-related questions;
    b) sending from the host computer, via the Internet, to the at least one organization computer a set of business related questions from the Master Questions Table;
    c) receiving on the host computer, via the Internet, an external signal containing answers to the set of business-related questions, and recording said answers to the questions in the computer memory, said signal generated by the at least one organization computer;
    d) selecting via automated software executing on the host computer a subset of baseline records category entries from the Baseline Records Categories Master Table based on the questionnaire answers, and recording said subset of baseline records category entries as an Organization Record Categories Table in the host computer memory;
    e) identifying and associating, via automated software executing on the host computer, at least one record retention rule from the Baseline Retention Rules Master Table with at least one of said selected subset of baseline records category entries in the Organization Record Categories Table; and
    f) generating and providing to the at least one organization computer, via the Internet, an electronically prepared records retention schedule, the electronically prepared records retention schedule including those identified record retention rules from the Baseline Retention Rules Master Table associated with the at least one of said selected subset of baseline records category entries in the Organization Record Categories Table, the identified record retention rules bein g a reduced subset of the plurality of the record retention rules in the Baseline Retention Rules Master Table.

2. The method of claim 1 further comprising the steps of:
    a) providing a signal to the host computer selecting a subset of entries from the Business Types and Functions Table, said signal generated by the at least one organization computer;
    b) providing said subset of entries from the Business Types and Functions Table as said answers to the questions recorded in the host computer memory; and
    c) providing a signal from the at least one organization computer to the host computer selecting a subset of entries from the Master Questions Table based on the entries selected from the Business Types and Functions Table, and providing a signal from the host computer to the at least one organization computer displaying said subset of questions on said organization computer.

3. The method of claim 2, wherein the step of selecting and displaying a subset of entries from the Master Questions Table includes displaying less than the selected subset of entries from the Master Questions Table on a first organization computer, and others of the selected subset of entries from the Master Questions Table on a second organization computer.

4. The method of claim 2, including the step of loading data into the host computer memory, and linking each entry in the Business Types and Functions Master Table with a plurality of entries in the Master Questions Table.

5. The method of claim 1, further including the steps of:
    a) receiving signals from the at least one organization computer associating entries in the Organization Record Categories Table with departments of the organization; and
    b) recording the associations between the organization departments and the entries in the Organization Record Categories Table in an Inventory Table.

6. The method of claim 5, further including the steps of:
    a) providing in the host computer memory, signals from the at least one organization computer associating entries in the Organization Record Categories Table with departments of the organization; and
    b) recording the associations between the organization departments and the entries in the Organization Record Categories Table.

7. The method of claim 1, further including the steps of:
    a) recording in each of a plurality of entries in a User Table, an identifier for a user in the organization;
    b) recording in each entry in an Organization Retention Rules Table, an approval flag initially set to "pending" status and an association with at least one User Table entry;
    c) recording in an entry of an Approval Project Table, a link to at least one Organization Retention Rules Table entry;
    d) receiving from the at least one organization computer, signals identifying and indicating approvals for, a plurality of approval flags; and
    e) setting the state of each identified approval flag to "approved" status.

8. The method of claim 7, further including the steps of:
    a) providing a lock flag in each Approval Project Table entry, initially set to an "unlock" status;
    b) receiving from the at least one organization computer, a signal identifying an Approval Project Table entry and requesting the lock flag for the identified entry be set to "locked" status; and c) preventing further alterations to Approval Project Table entries whose lock flag status is "locked".

9. The method of claim 8, further including the step of transmitting to an archiving facility, an Approval Project Table entry whose lock flag status is "locked" and entries from at least one of the Organization Retention Rules Table, an Organization Legal Requirements Table, and an Inventory Table linked to that Approval Project Table entry.

10. The method of claim 1, further comprising the steps of:
a) providing in the host computer memory a Baseline Legal Requirements and Retention Rules Linkage Master Table holding a plurality of legal requirements that form the basis for particular retention rules; and
b) linking entries in the Baseline Legal Requirements and Retention Rules Linkage Master Table to one or more entries in the Baseline Retention Rules Master Table.

11. The method of claim 1, wherein the step of generating and providing to the at least one organization computer the electronically prepared records retention schedule comprises the step of displaying on a computer screen the records retention schedule.

12. Apparatus for providing an electronically prepared record retention schedule for a selected organization, comprising:
a) a memory having stored therein, a Baseline Record Categories Master Table, Baseline Retention Rules Master Table, Business Types and Functions Table, and a Master Questions Table, each table having a plurality of entries respectively comprising baseline record category descriptions, record retention rules, business types and functions descriptions, and business-related questions;
b) software in communication with the memory for receiving, via the Internet, an external signal containing answers to a set of business-related questions from the Master Questions Table, and recording said answers to the questions in the computer memory;
c) automated software in communication with the memory for selecting a subset of baseline records category entries from the Baseline Records Categories Master Table based on the questionnaire answers, and recording said subset of baseline records category entries as an Organization Record Categories Table in the memory;
d) automated software in communication with the memory for identifying and associating at least one record retention rule from the Baseline Retention Rules Master Table with at least one of the selected subset of baseline records category entries in the Organization Record Categories Table; and
e) software in communication with the memory for generating an electronically prepared records retention schedule and providing a signal capable of being received via the Internet by a separate organization computer encoding the electronically prepared records retention schedule including those identified record retention rule from the Baseline Retention Rules Master Table associated with the at least one of the selected subset of baseline records category entries in the Organization Record Categories Table, the identified record retention rules being a reduced subset of the plurality of the record retention rules in the Baseline Retention Rules Master Table.

13. The apparatus of claim 12, further comprising:
a) software in communication with the memory for providing a signal to the host computer selecting a subset of entries from the Business Types and Functions Table;
b) software in communication with the memory for providing said subset of entries from the Business Types and Functions Table as said answers to the questions recorded in the host computer memory; and
c) software in communication with the memory for providing a signal to the host computer selecting a subset of entries from the Master Questions Table based on the entries selected from the Business Types and Functions Table, and providing a signal to at least one organization computer displaying said subset of questions on said organization computer.

14. A system for providing an electronically prepared record retention schedule for a selected organization, comprising:
a memory comprising a record categories master table including record category descriptions, a retention rules master table including record retention rules, and a master questions table comprising business-related questions;
software in communication with the memory for sending to the organization via the Internet a set of the business related questions selected from the master questions table;
software in communication with the memory for receiving answers to the set of the business-related questions via the Internet from at least one user at the organization and storing said answers in the memory;
automated software in communication with the memory for selecting, based on the answers, a subset of records category descriptions from the record categories master table which pertain to the organization, and storing said subset of records category descriptions as an organization record categories table in the memory;
automated software in communication with the memory for identifying, and generating a link between, each of at least one of the selected subset of record category descriptions in the organization record categories table and at least one record retention rule from the retention rules master table; and
software in communication with the memory for generating and displaying via the Internet on an organization computer a record retention schedule for the selected organization, the record retention schedule comprising each of those identified record retention rules from the retention rules master table for which a link has been generated and each of the at least one of the selected subset of record category descriptions in the organization record categories table linked thereto, the identified record retention rules being a reduced subset of a plurality of record retention rules in the retention rules master table.

* * * * *